March 21, 1950  J. W. KARWEIT  2,501,177
DRILL SPINDLE AND FEED
Filed Dec. 9, 1942  2 Sheets-Sheet 1

INVENTOR.
John W. Karweit
BY
HIS ATTORNEY

Patented Mar. 21, 1950

2,501,177

UNITED STATES PATENT OFFICE 2,501,177

DRILL SPINDLE AND FEED

John W. Karweit, Skokie, Ill., assignor, by mesne assignments, to Ex-Cell-O Corporation, Detroit, Mich., a corporation of Michigan Application December 9, 1942, Serial No. 468,399

11 Claims. (Cl. 77—33)

The invention relates to power driven tools and more particularly to drill presses and similar tools by which a twist drill or the like is fed into a work piece by means of a non-rotating element such as a quill or a member carried by the quill or a traverse head rotatably supporting the drill.

It is well recognized in obtaining optimum results in the art of drilling that the requirements regarding the handling of chips, lubrication, bushings, etc. differ with different materials. For instance, in drilling Monel, lubrication must be present at the cutting edge at all times, and, the long, sharp work hardened chips cause trouble with bushings, and injury to the operators. Furthermore, in drilling plastics and elastomers speed is critical because it is not certain that cooling lubricant can reach the drill tip at all times, due to the chip clogging the flutes. Generally the cutting speed is kept down so that fusing temperatures are minimized that would otherwise be generated too rapidly to be detected until it was too late. Copper and like stringy metals need lubricant primarily to assist removal of long chips which pack in the flutes and cause sufficient friction on the walls of the cut to develop a fusing temperature that would result in breaking the drill. Most of these troubles are chip problems.

In the present invention the ability of the device to produce chips of a uniform and small size, regardless of the material being worked, places the chip problem upon a common denominator for all materials, thereby standardizing the chip handling for all materials. Furthermore, bushings can be located nearer to the work than heretofore possible. In fact they can be located against the work if desired to serve as a starting means for the drill in lieu of a punch-prick, or the like, and the jigs can be kept clean of chips that would otherwise hamper operations. In addition to this, the chip waste of all materials can be handled in the same way without cutting or baling the waste and, in some instances, without centrifuging the waste to remove lubricant.

A further object of the invention is to provide a drilling arrangement which can be used with a wide range of materials within the rated cutting speeds of the materials. Spoken of another way, changes in drill press set-ups for different materials are reduced to the single criterion of changing the drill speed to conform with the rated cutting speed of the material being machined.

Another object of the invention resides in the provision of an improved drill press with which the tool life of the drills is increased.

A further object of the invention is fulfilled by bathing the cutting edge of a twist drill on both sides of the edge with a coolant once every revolution when cutting such material as Monel.

A further object is to provide an automatic chip breaking driller which is displaced axially under the positive action of a cam in both directions whereby the action of the drill in a cut is positively controlled according to a predetermined pattern regardless of the inertial mass of moving elements.

A further object of the invention is to provide an improved drill press for handling a miscellany of materials which can be operated in production by persons unskilled mechanically.

Another object of the invention is to provide a construction by which conventional drill presses can be converted simply and quickly to embody the invention as a part thereof. Furthermore, because of the character of the invention and its universal and many improved results, it can also be incorporated as an integral part of a drill press as original equipment.

Another object of the invention is to provide a device of the class described which is simple in construction and operation, readily installed and used, and inexpensive to manufacture and maintain.

These being among the objects of the invention, other and further objects will appear from the drawings, the description relating thereto, and the appended claims.

Referring now to the drawings.

Figures 1, 3, 4:
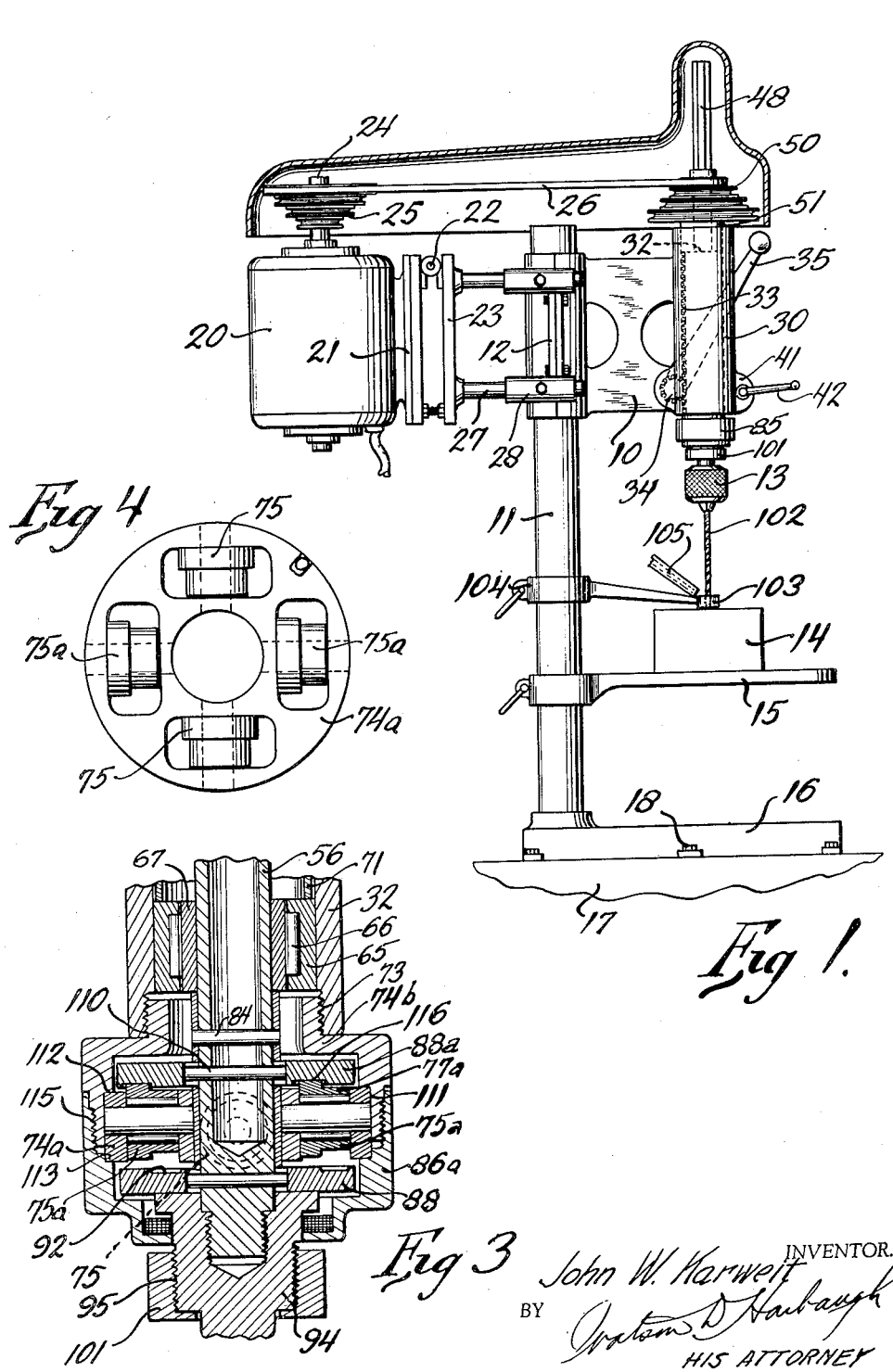
Fig. 1 is a side elevation of a drill press embodying the invention.
Fig. 3 is a view similar to Fig. 2 illustrating another embodiment of the invention with the illustration thereof restricted to the lower portion of the quill assembly.
Fig. 4 is a plan view of the roller cage embodied in Fig. 3.

The drill press head 10 shown in Fig. 1 is slidably mounted upon the standard 11 and locked thereon at any given point of adjustment by a split sleeve arrangement 12 so that a drill chuck 13 may be suitably located with respect to a work piece 14 disposed upon the work table 15. The standard 11 in turn is supported upon a base 16 which is secured to a floor or table 17 by bolts 18.

As viewed in Fig. 1 a motor 20 is mounted at the left of the standard 11 upon a base 21 which is pivoted as at 22 to an adjustable carrier 23. The drive shaft 24 of the motor is disposed vertically and carries a step pulley 25 driving a V belt 26. The carrier 23 is provided with rod supports 27 slidably received in collars 28 by which the tension upon the V belt 26 may be adjusted. The location of the pivot 22 permits the motor to be pivoted about a horizontal axis to release the belt whenever the belt is shifted to other grooves upon the pulley 25.

Upon the right hand side of the support 11 the head 10 is provided with a cored enlargement 30 which is machined to receive the working parts that will now be described.

Figure 2:
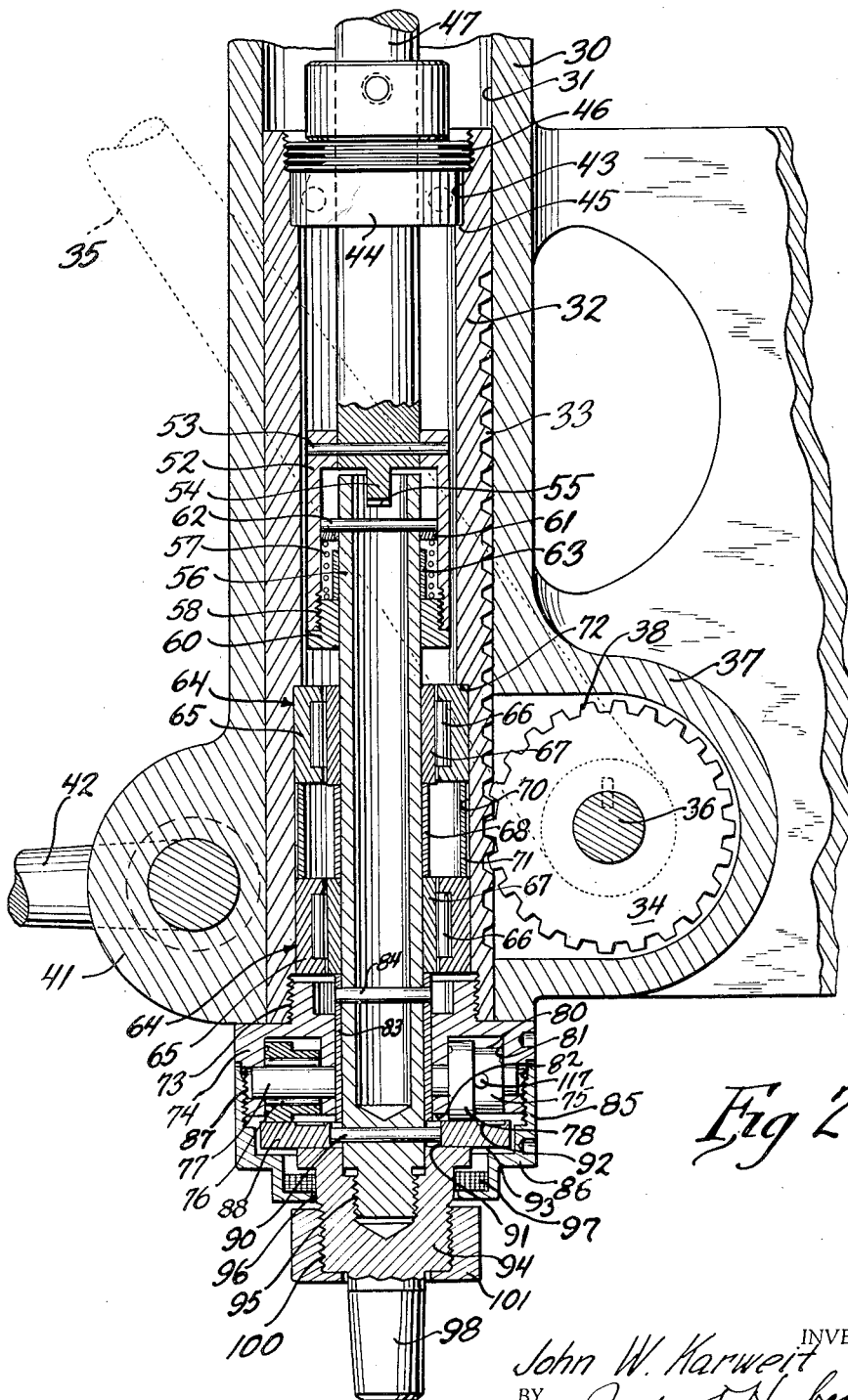
Fig. 2 is an enlarged vertical section illustrating the quill assembly of the press shown in Fig. 1.

Referring to Fig. 2 the cored enlargement 30 is machined to provide a cylindrical bore 31 in which is mounted, for reciprocation, a quill 32 having upon one side thereof a rack 33. The rack is engaged by a gear 34 carried by a shaft 36 that is journalled in an enlargement 37 in the head so that the teeth 38 of the gear extend into the bore 31 far enough to engage the rack 33. A handle 35 is employed to traverse the quill. As the handle 35 is moved downwardly the gear 34 moves the quill 32 downwardly, and, if it is desirable at any time to lock the quill in any particular position, the lower end of the enlargement 30 is split to provide a C clamp relationship as at 41 which is controlled by a clamp bolt 42.

The quill 32 is a cylindrical member whose upper end is internally counterbored as at 43 to receive a spindle bearing 44 snugly therein against a shoulder 45 where it is held in place by means of a lock nut 46 threaded into the upper end of the quill 32.

The bearing 44 is a frictionless bearing of the ball bearing type with the inner race thereof press fitted upon a drive shaft 47 which is splined at its upper end as at 48 to receive a driven pulley 50 in drive relation. The pulley 50 is journalled on a carrier 51 upon the upper end of the enlargement 30 by means of suitable bearings (not shown) preferably frictionless, of the ball bearing type.

With the construction thus far described, the drive shaft 75 is permitted to slide up and down through the pulley 50 under the influence of the reciprocation of the quill 32, yet maintains its drive relationship with the pulley 50 through the splines 48. The shaft 47 is thereby held in axial alignment by the bearings supporting the pulley 50 where it engages the pulley, and the frictionless bearing 44 in the quill.

The lower end of the drive shaft 47, extends beyond the bearing 44 where it is provided with a sleeve 52 held tightly in place by means of a pin 53. A tang 54 formed on the lower end of the shaft extends downwardly into the sleeve.

The tang 54 is engaged in driving relationship in a groove 55 upon the upper end of a driven shaft 56 held in place by means of a compression spring 57. In providing the proper tension upon the spring, the lower end of the sleeve 52 is threaded as at 58 to receive a nut 60 that compresses the spring to exert the necessary effort against a washer 61 held in place upon the driven shaft by means of a pin 62. A spacer 63 is located between the nut 60 and the washer 61 to permit relative axial movement between the drive shaft 47 and the driven shaft 56.

The driven shaft 56 is journalled in the lower end of the quill 32 by means of two spaced roller bearings 64, the outer race 65 of which serves as a cage holding the rollers 66 in place against axial displacement while the inner race 67 is permitted to slide longitudinally of the rollers 66 to permit relative movement between the inner race and outer race of the roller bearings.

The inner races 67 are press fitted to the driven shaft 66 as spaced by a sleeve 68 and the outer races are received in an enlargement 70 in the quill as spaced by a sleeve 71 with the outer race of the upper bearing resting against a shoulder 72 on the quill.

With this relationship the driven shaft 56 may be reciprocated with respect to the drive shaft 47 to a limited extent while rotating in the quill 32, and the spring 57 urges the driven shaft 56 to its upper limit of the reciprocal movement. To the extent permitted without reducing its strength, the driven shaft 56 is lightened as much as possible to reduce inertial weight.

At the lower end the quill is threaded as at 73 to receive a supporting member or housing in the form of a cage 74 in which are mounted rollers 75 journalled by needle bearings 76 upon pins 77 disposed radially with respect to the axis of rotation of the driven shaft and diametrically opposite each other.

Each roller 75 has a raised tread portion 78, and a reduced portion 80. The tread portion 78 of one roller is disposed next to the driven shaft 56, while the tread portion 78 of the other roller is disposed remote from the shaft 56 with the reduced portion serving as a spacer and extra bearing area. In this way the tread portions of the respective rollers move in two circular paths of different diameters. The rollers are located in recesses 81 to extend beyond the lower end 82 of the cage.

The inner ends of the pins 77 are held in place by a sleeve 83 journalled in the cage as supported by a pin 84 upon the driven shaft 56. The outer ends of the pin 77 are held in place by a cylindrical flange 85 on a cap 86 which is threaded as at 87 to the cage 74.

A cam member 88 is rotatably coupled to the lower end of the shaft 56 by a pin 90 extending into radial kerfs 91 cut in the disk 88. Upon the upper face of the disk 88 circular paths or dwells are machined upon which the treads 78 of the rollers run and include certain relieved portions 92 which serve as cams with dwell and relief areas into which the treads 78 roll and permit an upward movement of the driven shaft 56, each revolution, under influence of the spring 57. Although one roller and one cam would suffice, it is preferred to use two rollers and two cam contours disposed diametrically opposite each other so that the effort upon the driven shaft is balanced.

The other face 93 of the disk 88 is flat so that if the disk were to be removed from engagement with the pin 90 and turned over, the treads 78 would run upon a smooth surface and there would be no reciprocation between the drive and driven shafts. With this last arrangement the drill press operates in the conventional manner.

The disk 88 is held in place by means of a nut 94 threaded to a reduced end portion 95 of the driven shaft 56, the nut having a cylindrical surface as indicated at 96 against which a grease seal 97 runs as held in place by means of the cap 85. The lower end of the nut 94 may be conformed in any suitable manner to receive conventional drill chucks. In the particular embodiment shown a Jacobs taper is indicated at 98 with the nut threaded as at 100 to receive a chuck release nut 101. If the nut 94 were made longer at its lower end a Morse female taper could be provided therein in place of the Jacobs taper 98.

With the chuck 13 secured upon the taper 98 and a drill 102 received in the chuck, the device is ready for operation upon a work piece 14. It is preferred that the drill 102 be a high spiral drill for flute space. In event the drill 102 is a long one, a bushing 103 is generally provided to help guide the drill, which bushing is secured upon the support 11 at any adjusted position by means of a C clamp arrangement 104. Lubricant is supplied to the cut by means of a nozzle 105 which directs the flow of lubricant at the drill point where it enters the work piece 14.

The contour of the camming surface 92 is relatively important, it being preferred to have a contour which permits the drill to cut free from the work and thereby cut the chip as fast as the spring 57 can move the mass carried by the driven shaft. The roller 75 at all times should be in contact with the disk 88. After the chip is cut free, it is desirable to have the drill returned to its cutting position as rapidly as possible so that there is little time for the lost motion between the drive and driven shafts to be picked up by the feed effort. This is particularly true with automatic feeds whereas the return of the drill to cutting position can be more gradual where the feed is manual.

In an automatic feed where the feed is positive and constant the ducking of the drill to free the chip is not so critical in varying the cutting position of the drill with respect to the work when it is being returned to the cut. The creep of the feed during the ducking of the drill under automatic feed is very little and the drill is returned to the cut with only a slight impulse to start the cutting edge into the material without it having a chance to ride the material and dull the cutting edge.

With a hand feed it is possible to have a little longer incline towards the end of the cam to return the drill to cutting position due to the feed effort of the hand being able to pick up some of the lost motion arising in ducking the drill. This is possible with the hand feed since there is a tendency in the hand itself to return the cutting edges to the cutting position more rapidly than would be present with an automatic positive feed. With the cam action more gradual at the critical point the lost motion pick-up of the hand feed is not compounded with the return feed as heavily as it otherwise would be, and provides a smoother drilling operation in which the load upon the drill entering the work is merely appreciable.

In the absence of any appreciable pickup of the lost motion by the hand feed before the drill is returned to its cutting position the optimum result is to duck the drill as fast as possible to cut the chip free and return the drill point to its cutting position as soon thereafter as possible, preferably without the cam and follower hammering at a given working speed. This rapidity of the ducking supplies a very desirable vibration in the drill which keeps the chips loose in the flutes and carries these chips out of the drill and through a bushing with little danger of the chips becoming packed in the flutes.

Furthermore, it is preferred that the depth of the cam be such that the cutting edge of the drill clears the work in breaking the chip. An average depth of .025 of an inch has been found to be satisfactory with medium sized drills. Not only does this assure that the chips will be cut free but whenever lubricant is used both sides of each drill edge is exposed to lubricant at the bottom of the hole. Not only does the vibratory action of the drill aid in carrying the chips from the flutes but it also aids in carrying the lubricant down the flutes through the chips to the cutting edge, it being preferred for deep hole drilling to dispose the drill vertically and feed it downwardly so that gravity aids the vibration in carrying the lubricant to the end of the drill.

Referring to the embodiment shown in Figs. 3 and 4, a modified construction of the cage 74 is shown wherein a second pair of rollers 75a and disk 88a are substituted for the spring 57 so that the driven shaft 56 is displaced positively in both directions. In some applications where a spring is used it has been found that without providing a means for tightening the tension upon the spring 57 the speed of the drill 102 may be such that the roller leaves contact with the cam 92 and does not reach the depth of the cam 92 to assure cutting the chip free each revolution, it being appreciated that the question involved is one regarding the capacity of a resilient element to overcome an inertial mass at higher speeds.

In the embodiments shown in Figs. 3 and 4, positive displacement both ways is provided to eliminate this difficulty. More particularly, a cage 74a (Fig. 4) is provided with two pairs of rollers. One pair 75 engages the disk 88 in the manner and for the purposes already described in connection with the disclosure made in Fig. 2 and the other pair 75a have their axes offset vertically above the axes of the rollers 75 in order to ride against a disk 88a supported upon the driven shaft 56 by a pin 110.

However, in order to install the disk 88a above the rollers the cage is split into two parts, the cage 74a, and the housing portion 74b which is recessed as at 111 to receive the cage 74a as a separate unit against the shoulder 112. The cap 86a is also recessed to provide a shoulder 113 holding the cage in place when the cap 86a is threaded as at 115 to the cage housing 76b. The cams 116 upon the disk 88a are complementary to the cams upon the disk 88 in their cooperation with the rollers 75 and 75a. This complementary relationship is characterized by the rollers 75a rolling into the cams 116, while the rollers 75 are in contact with the surface of the disk 88, and rolling out of the cams 116 upon the surface of the disk 88a when the rollers 75 roll into the cams 92. Although a double cam arrangement could be used with a single roller or pair of rollers, with a slight clearance provided, the arrangement illustrated is preferred since the rollers do not have to reverse their direction of rotation when cooperating with the two cam surfaces during rotation of the driven shaft.

The needle bearings 76 of the rollers are lubricated through grease passageways 117 in the rollers as shown in Fig. 2 with the working parts otherwise packed in grease before the cap 86 or 86a is tightened upon the cage 74 or cage housing 76b, respectively.

Whenever it is desirable to use a drill press with a wide range of drill sizes a plurality of interchangeable disks 88 may be supplied with the drill press with the cam contours 92 made of different depths. The cam depth upon the disk 88 will be less for small drills than it would be for large drills, and althoough the full range of drills will work with a cam designed to accommodate the largest drill, it is preferred to have cams of lesser depth for the small drills so that the spindle may be revolved without needless extra vibration or hammering at the higher speeds at which the smaller drills work best.

Cams of different depths also are desirable in working in different materials, particularly in production work where if it is desirable for a drill of a particular size to be fed at a greater traverse speed in one material than in another, the cam of the greater depth can be employed by which the chip can be cut to the same length although its thickness may vary. In this last instance, the faster feed and the deeper cam are particularly desirable with plastics. It will be understood by those skilled in the art that once they understand the operation of applicant's device they can determine empirically whether or not a hand feed is too fast for a particular cam since they will recognize that the desired maximum feed rate in relation to the depth of the cam is reached when the chips are cut and come out singly. An over-feeding relationship would result in the chips being tied together by thin webs which although not as desirable as having the chips come out separated and cut clean from each other, does not have the disadvantages encountered with conventional chips since the chips buckle and break of their own accord in the flutes after they have left the cutting edge. Consequently, although the operation can be described as one in which the drill "breaks" the chip, the drill actually cuts the chip clean from the work. In this cutting of the chip from the work each revolution the fact that an overfeed may provide a small web between successive chips does not detract from the principle of the invention that the bodies of the chips being removed from the cut should function as small units more or less independently of each other even when tied by a thin web.

Consequently, although several embodiments of the invention have been shown and described herein it will be readily apparent that within the teachings of the present invention various modifications and changes may be made without departing from the spirit of the invention, the scope of which is commensurate with the appended claims.

The claims of the present application cover a species subordinate to the subject matter disclosed and claimed in my co-pending application Serial No. 484,612, filed April 26, 1943, now U. S. Patent Number 2,453,136, issued November 9, 1948.

What is claimed is:

1. A device of the class described comprising a quill, a drive shaft and shaft driven by the drive shaft, means for journalling the driven shaft in the quill for rotation and relative axial displacement, a cage carried by the quill, a plurality of rollers mounted in the cage with their axes of rotation spaced from one another in a direction axially of the driven shaft, a cam member carried by the driven shaft in position to engage one of the rollers to carry end thrust loads between the shafts, means for holding the roller in contact with the cam member including a complementary cam and another of the rollers, and means for releasably retaining the cam member in place including an element for supporting a drill.

2. A quill assembly for a power driven drill press, said assembly including a sleeve having a rack on its outer surface and adapted to be received for reciprocation in a bore upon a supporting housing, a driven shaft, means for mounting the shaft for rotation and relative reciprocation in the sleeve including a frictionless centering bearing one member of which is carried by the shaft and is slidable axially with respect to the sleeve for relative axial movement of the shaft, means upon said shaft for supporting a twist drill in working position, a gear engaging said rack to feed traverse the sleeve by a unidirection main feed movement continuous for a great number of revolutions of the drill, and means for reciprocating the drill each revolution of the shaft in a direction opposite to the direction of its feed movement a slight distance enough to comminute the chips formed during the main feed traverse.

3. A device for drilling machinable material comprising, in combination, a supporting cage adapted to be mounted for cutting feed movement and to be constrained against rotation, a driven shaft member disposed on an axis projecting through said cage and adapted to be connected for rotary power drive and for limited independent axial movement relative to said cage, said shaft member being adapted to support a fluted drill at one end in coaxial relation thereto and for rotary and axial movement therewith, and relatively revoluble coacting cam and cam follower elements for normally sustaining said shaft member against the axial drilling thrust, one of said elements being carried by said cage in fixed axial position relative thereto, the other of said elements being supported from said shaft member in opposed relation to said one element, and being operatively connected to said shaft member for rotary drive therefrom, said elements being operable at least once during each relative revolution therebetween and each time within a minor portion of said revolution, to effect a positive axial reciprocation of said shaft member with respect to said cage out of normal position comprising first a positive relief stroke followed by a positive return stroke through a small fraction of an inch to effect termination of a chip being formed by the drill when cutting.

4. A device according to claim 3 in which the cam element comprises two oppositely facing complemental cam tracks extending coaxially about the driven shaft, said tracks each having alternating dwell and relief areas of substantially the same axial throw, with the dwell and relief areas of each track corresponding substantially in arcuate length and in angular phase relative to the follower element respectively with the relief and dwell areas of the opposite track, and the cam follower element comprises follower members coacting respectively with said cam tracks, said cam tracks acting alternately to impart positive thrusts in opposite directions axially of said shaft member, whereby to effect said relief and return strokes.

5. A device according to claim 4 in which the cam tracks are formed in opposed relation on the adjacent side faces of two axially spaced annular cam disks secured for rotary drive from said shaft member and constrained for axial movement with said shaft member, and said follower members are supported in said cage in position between said tracks and are constrained against axial displacement relative to said cage.

6. A device according to claim 5 in which said cam tracks are 90° out of angular phase with respect to each other and each cam track comprises two like radially spaced cam paths 180° out of angular phase, and said follower members comprise two sets of diametrically opposite rollers, said sets of rollers being supported in said cage 90° out of phase and coacting respectively with said cam tracks, with the rollers of each set coacting respectively with the associated cam paths.

7. A device for drilling machinable material comprising, in combination, a supporting quill mounted for axial cutting feed movement and constrained against rotation, a cage rigidly secured directly to one end portion of said quill for movement therewith, a driven shaft member journalled in and projecting from said cage axially of said quill and adapted to be connected for rotary power drive and for limited independent axial movement relative to said cage, said shaft member being adapted to support a fluted drill at one end in coaxial relation thereto and for rotary and axial movement therewith, and relatively revoluble coacting cam and cam follower elements for normally sustaining said shaft member against the axial drilling thrust, one of said elements being carried by said cage in fixed axial position relative thereto, the other of said elements being supported from said shaft member in opposed relation to said one element, and being operatively connected to said shaft member for rotary drive therefrom, said elements being operable at least once during each relative revolution therebetween and each time within a minor portion of said revolution, to effect a positive axial reciprocation of said shaft member with respect to said cage out of normal position comprising first a positive relief stroke followed by a positive return stroke through a small fraction of an inch to effect termination of a chip being formed by the drill when cutting.

8. A device according to claim 7 in which said driven shaft extends from said cage axially into one end of said quill, in combination with axially slidable roller bearings for journalling said shaft in said quill, a power operable rotary drive shaft extending into the other end of said quill for axial movement therewith and in substantial axial alignment with said driven shaft, and coupling means in said quill for interconnecting said shafts for joint rotation and relative axial reciprocation.

9. A device according to claim 8 in which said coupling means comprises an axial tang and slot spline connection between the adjacent ends of said shafts, a housing fixed on one of said shafts and slidably receiving the other of said shafts and enclosing said connection, and spring means within said housing acting on said driven shaft in a direction to retract said driven shaft into said quill.

10. A device according to claim 7 in which said cage comprises an internal member in combination with an outer enclosing housing having opposite end sections removably secured together to clamp said cage therebetween, said housing being directly attached to said quill.

11. A device for drilling machinable material comprising, in combination, a supporting member adapted to be mounted for cutting feed movement and to be constrained against rotation, a driven shaft member projecting from said supporting member and adapted to be connected for rotary power drive and for limited axial movement in the direction of said feed movement relative to said supporting member, said driven shaft member being adapted to support a fluted drill at the outer end in coaxial relation thereto and for rotary and axial movement therewith, a cage in said supporting member and encircling said shaft member, and relatively revoluble coacting cam and cam follower elements for normally sustaining said shaft member against the axial drilling thrust, the cam element comprising a circular end face cam encircling said shaft member and operatively connected to said shaft member for rotary drive therefrom and for axial movement therewith, and defining two inner and outer concentric cam tracks extending concentrically about said shaft member, each track being formed with alternating dwell and relief areas, said tracks being 180° out of angular phase, the follower element comprising diametrically aligned shafts in said cage and two rollers journalled respectively on said diametrical shafts and each having a diametrically enlarged tread on one end portion, said treads contacting and being relatively movable respectively along said tracks, and said rollers each being reversible end for end within said cage on the associated diametrical shaft so as to locate the tread selectively for rolling contact with either one of said concentric tracks, said elements being operable by reason of said dwell and relief areas at least once during each relative revolution therebetween and each time within a minor portion of said revolution, to effect an axial reciprocation of said shaft member with respect to said supporting member out of normal position comprising first a relief stroke followed by a return stroke through a small fraction of an inch to effect termination of a chip being formed by the drill when cutting.

JOHN W. KARWEIT.

REFERENCES CITED

The following references are of record in the file of this patent:

UNITED STATES PATENTS

| Number | Name | Date |
| --- | --- | --- |
| 627,074 | Conway | June 13, 1899 |
| 1,071,776 | Morrissey | Sept. 2, 1913 |
| 1,196,656 | Bugbee | Aug. 29, 1916 |
| 1,454,452 | Moore | May 8, 1923 |
| 1,523,629 | Bullock | Jan. 20, 1925 |
| 2,105,762 | Zimmerman | Jan. 18, 1938 |
| 2,176,316 | Swanson | Oct. 17, 1939 |

FOREIGN PATENTS

| Number | Country | Date |
| --- | --- | --- |
| 55,472 | Germany | Feb. 28, 1891 |